(12) United States Patent
Goessler et al.

(10) Patent No.: US 9,376,628 B2
(45) Date of Patent: Jun. 28, 2016

(54) PROCESS FOR OBTAINING COMBUSTIBLES AND FUELS, RESPECTIVELY

(75) Inventors: Helmut Goessler, Graz (AT); Wilhelm Hammer, Grambach/Graz (AT)

(73) Assignee: BDI-BIOENERGY INTERNATIONAL AG, Grambach (AT)

( * ) Notice: Subject to any disclaimer, the term of this patent is extended or adjusted under 35 U.S.C. 154(b) by 754 days.

(21) Appl. No.: 13/119,430

(22) PCT Filed: Sep. 17, 2009

(86) PCT No.: PCT/EP2009/062037
§ 371 (c)(1),
(2), (4) Date: May 9, 2011

(87) PCT Pub. No.: WO2010/031803
PCT Pub. Date: Mar. 25, 2010

(65) Prior Publication Data
US 2011/0296742 A1 Dec. 8, 2011

(30) Foreign Application Priority Data
Sep. 17, 2008 (EP) .................................. 08450140

(51) Int. Cl.
*C10G 1/02* (2006.01)
*C10G 9/00* (2006.01)
*C10G 3/00* (2006.01)

(52) U.S. Cl.
CPC .. *C10G 1/02* (2013.01); *C10G 3/49* (2013.01); *C10G 3/54* (2013.01); *C10G 9/00* (2013.01); *C10G 2300/1011* (2013.01); *C10G 2300/1074* (2013.01); *Y02E 50/30* (2013.01); *Y02P 30/20* (2015.11)

(58) Field of Classification Search
CPC .............. C10G 3/00; C10G 9/00; C10G 9/28; C10G 9/30; C10G 1/00; C10G 1/02; Y02E 50/14; Y02E 50/15
USPC .......... 585/240, 242; 208/131, 415, 428, 434, 208/85, 187, 106
See application file for complete search history.

(56) References Cited

U.S. PATENT DOCUMENTS

| | | | |
|---|---|---|---|
| 4,266,083 A | 5/1981 | Huang | |
| 4,941,966 A | 7/1990 | Merz et al. | |
| 5,223,601 A * | 6/1993 | Chum | C07C 37/52 428/514 |
| 5,792,340 A * | 8/1998 | Freel et al. | 585/240 |
| 2004/0069686 A1* | 4/2004 | Freel et al. | 208/226 |
| 2004/0097369 A1* | 5/2004 | Freel et al. | 502/437 |
| 2004/0123519 A1* | 7/2004 | Shigehisa et al. | 44/605 |
| 2007/0261996 A1 | 11/2007 | Siekmann et al. | |
| 2009/0227823 A1* | 9/2009 | Huber et al. | 585/324 |
| 2009/0299112 A1* | 12/2009 | Bauer et al. | 585/240 |
| 2011/0110849 A1* | 5/2011 | Siemons | 585/654 |

FOREIGN PATENT DOCUMENTS

| | | |
|---|---|---|
| DE | 102 15 679 | 11/2003 |
| DE | 10215679 A1 | 11/2003 |
| WO | 2008/020048 | 2/2008 |

* cited by examiner

*Primary Examiner* — Michelle Stein
(74) *Attorney, Agent, or Firm* — Maschoff Brennan

(57) ABSTRACT

A process for obtaining a combustible or fuel, respectively, by thermally cracking a heavy oil in the presence of a wet, hydrocarbonaceous biomass by heating the heavy oil until the pyrolysis of the hydrocarbonaceous biomass, whereby the combustibles and fuels, respectively, are formed, removed from the heated heavy oil and subsequently condensed, characterized in that a hydrocarbonaceous biomass is used the moisture content of which amounts to, at most, 1.0% by weight, based on the biomass.

18 Claims, 3 Drawing Sheets

PROCESS FOR OBTAINING COMBUSTIBLES AND FUELS, RESPECTIVELY

The invention relates to a process for obtaining a combustible or fuel, respectively, by thermally cracking a heavy oil in the presence of a wet, hydrocarbonaceous biomass by heating the heavy oil until the pyrolysis of the hydrocarbonaceous biomass, whereby the combustibles and fuels, respectively, are formed, removed from the heated heavy oil and subsequently condensed.

It is known from the literature that, during a liquid-phase pyrolysis, a biogenic feedstock is converted in a carrier oil at temperatures of approximately 300° C. to 350° C. in order to obtain a pyrolysis oil. In doing so, carrier oils described as inert such as, e.g., thermal oils are mostly used, which are thermally very resistant and, as far as possible, do not participate in the pyrolysis reaction of the biomass.

These processes have the disadvantage that thermally resistant carrier oils are expensive and have to be cleaned from pyrolysis residues in a very costly way before they can be used again for liquid-phase pyrolysis. However, an entirely lossless cleaning and separation, respectively, of such carrier oils from pyrolysis residues is not possible under economic aspects. Therefore, due to the increased consumption of carrier oil and the required catalysts, the production costs of such processes are mostly uneconomical for the obtainment of combustibles and fuels, respectively.

In US 2007/0261996 A1, an oiling process for biomass using a carrier oil referred to as a contact oil is shown. The carrier oil has an initial boiling point of at least 200° C., in the exemplary embodiment which is mentioned, a conventional heavy oil is used as the carrier oil. In this oiling process, any biomass containing sugar, for example, wood or straw, and having a moisture content of up to 30% by weight can be used as a biogenic starting material. Prior to the contact with the carrier oil, the biomass is heated to a temperature of between 40° C. and, at most, 150° C. and reaches a reactor chamber in the preheated state. In the reactor chamber, the biomass is contacted with the hot carrier oil which has been provided and is cleaved at reaction temperatures of between 200° C. and 600° C. In a subsequent regeneration step, the reaction phase is separated into a low-boiling fraction and a high-boiling fraction, wherein the high-boiling fraction is, at least partly, reused as a carrier oil.

This oiling process has the disadvantage that the wet biomass is contacted with the hot carrier oil directly in the reactor chamber. In doing so, neither a preliminary drying nor a preliminary contact of the biomass with the preheated carrier oil occurs outside of the reactor chamber in order to reduce the moisture content of the biomass as gently as possible, and a determination of the moisture content of the biomass prior to the transport into the reactor chamber is not provided, either. The moisture contained in the biomass leads to an undesirably increased formation of water vapour in the reactor chamber and thus to a decreased product yield and a reduced product quality, respectively.

Furthermore, the addition of a fixed-bed catalyst, for example, a catalyst molecular sieve, in the reaction phase is provided in this oiling process. The operating costs are therefore increased in comparison to catalyst-free oiling processes.

It is thus the object of the present invention to indicate a process for obtaining a combustible or fuel, respectively, by thermally cracking a heavy oil in the presence of a wet, hydrocarbonaceous biomass, which avoids the described disadvantages of the prior art and with which an amount of shorter-chain hydrocarbons as high as possible is achieved in the cleavage products.

Said object is achieved in a process for obtaining a combustible or fuel, respectively, according to the preamble of claim 1 having the features of the characterizing part of claim 1. The subordinate claims relate to further advantageous embodiments of the invention.

The process according to the invention is a process for obtaining a combustible or fuel, respectively, by thermally cracking a heavy oil in the presence of a wet, hydrocarbonaceous biomass by heating the heavy oil until the pyrolysis of the hydrocarbonaceous biomass, whereby the combustibles and fuels, respectively, are formed, removed from the heated heavy oil and subsequently condensed, with a hydrocarbonaceous biomass being used the moisture content of which amounts to, at most, 1.0% by weight, based on the biomass.

As heavy oils, for example, mineral oils, in particular high-boiling residual oils from mineral oil refining, as well as vegetable or animal fats and oils can be used in pure quality or in mixtures. Preferably, such heavy oils start to boil only at temperatures of above 250° C.

It is likewise conceivable to use waste products or byproducts from vegetable oil refining, for example, Palm Fatty Acid Distillate (PFAD), as heavy oils in the production process according to the invention.

Both cellulose-containing biogenic materials, for example, wood, straw, pulp or stones of fruits, and a biogenic material which is free from cellulose, for example, residues of algae, bone or animal meal or sewage sludge, can be used as the hydrocarbonaceous biomass. Oil press residues from vegetable oil production, for example, rape-seed cake, may also be utilized according to the invention as a hydrocarbonaceous biomass.

It is advantageous if the hydrocarbonaceous biomass has a nitrogen load which is as low as possible. Thereby, $N_2$ is prevented from being introduced into the fuel phase.

Drying of the hydrocarbonaceous biomass in order to ensure a moisture content of, at most, 1.0% by weight, based on the biomass, is effected according to drying methods known per se. For this purpose, the moisture content of the biomass is determined before and after drying. Temperatures ranging between 80° C. and 200° C., in particular temperatures of about 150° C., are advantageous for drying the biomass.

In a preferred embodiment of a process according to the invention, a hydrocarbonaceous biomass is used the moisture content of which amounts to, at most, 0.5% by weight, based on the biomass.

In a process according to the invention, the biomass is suitably contained in the heavy oil in a maximum amount of 30% by weight, based on the total mass.

In one process, in a variant of the invention, the biomass is contained in the heavy oil in a maximum amount of 20% by weight, based on the total mass.

In a further variant of a process according to the invention, the biomass is contained in the heavy oil in an amount of less than 5% by weight, based on the total mass.

The content of biomass in the heavy oil is at least 0.001% by weight, based on the total mass.

It has surprisingly been found that, in the process according to the invention, a smaller amount of biomass in the heavy oil already leads to a cracking of the heavy oil. Large amounts of cheap waste and residual oils, respectively, which otherwise would have to be disposed of mostly in a costly manner, can thus be utilized as heavy oils for obtaining a combustible or fuel, respectively, using comparatively small amounts of biomass. Thus, the process according to the invention provides a further advantage over oiling processes known from the state of the art which aim at an amount of biomass to be converted or cleaved, respectively, which is as high as possible.

In one process, the heavy oil is heated advantageously to a temperature of between 250° C. and 450° C.

In a process according to the invention, the heavy oil is heated particularly advantageously to a temperature of between 320° C. and 400° C.

A variant of the invention envisages that, in one process, a residual oil from crude oil distillation, in particular vacuum gas oil, is used as the heavy oil.

Surprisingly, it has been found that, when residual oils or heavy oils from crude oil distillation are used, in particular with vacuum gas oil (VGO), not only is the biomass pyrolyzed, but the heavy oil is also cleaved at least partly, whereby shorter-chain hydrocarbons are formed, and that an additional creation of value can be achieved in this manner for the entire process.

Said VGO is a residual oil which accumulates as a bottom product during crude oil distillation. VGO is usually used as feedstock for a cracker (a thermal or catalytic cracker) in oder to obtain short-chain hydrocarbons therefrom. Depending on the process, temperatures of up to 800° C. and pressures of up to 5 bar, respectively, are required for thermal cracking in order to break down the residual oils. In comparison, catalyst temperatures of up to 550° C. are used for catalytic cracking and a reactivation of the catalyst is necessary.

An advantage of the process according to the invention, which is described here, lies in the reaction conditions with a reactor temperature of about 350° C. at normal pressure, which are mild in comparison to conventional cracking processes and are required for cleaving the VGO. It has been shown that, in the process according to the invention, the VGO is cleaved into shorter-chain hydrocarbons already at temperatures which are substantially lower than those of conventional thermal cracking. This suggests that the use of the biomass reduces the cracking temperature of the VGO.

In a production process according to the invention, particularly advantageously a hydrocarbonaceous biomass is used the moisture content of which has been adjusted by drying in a heated heavy oil, preferably vacuum gas oil.

By drying the wet biomass in a heated heavy oil, the moisture content of the biomass is advantageously reduced gently and the biomass is already contacted with the heavy oil. The drying of the biomass impregnated with heavy oil occurs at temperatures of about 150° C., at most, of up to 200° C. The moisture which thereby leaks from the biomass is collected and separated, e.g., in a condenser. Subsequently, the biomass impregnated with heavy oil is heated further and contacted with a boiling heavy oil, respectively, and the heavy oil is cracked in the presence of the biomass.

In a further embodiment of a process according to the invention, the biomass is separated from the excess heavy oil by a separation process after drying, with the biomass being contained in the heavy oil in an amount of more than 15% by weight, preferably more than 25% by weight, based on the total mass.

It is prevented by a separation process for separating the excess heavy oil that a too high amount of heavy oil reaches subsequent process steps along with the biomass after drying, which process steps are conducted at temperatures higher than the drying temperature and are cooled too strongly if the heavy oil which has been supplied. For example, mechanical separation processes, in particular sedimentation and centrifugal processes, respectively, filtration or pressing processes, are provided as separation processes for separating the excess amount of heavy oil from the biomass.

Further features of the invention become apparent from the following description of exemplary embodiments and with reference to the drawings.

Figure 1:
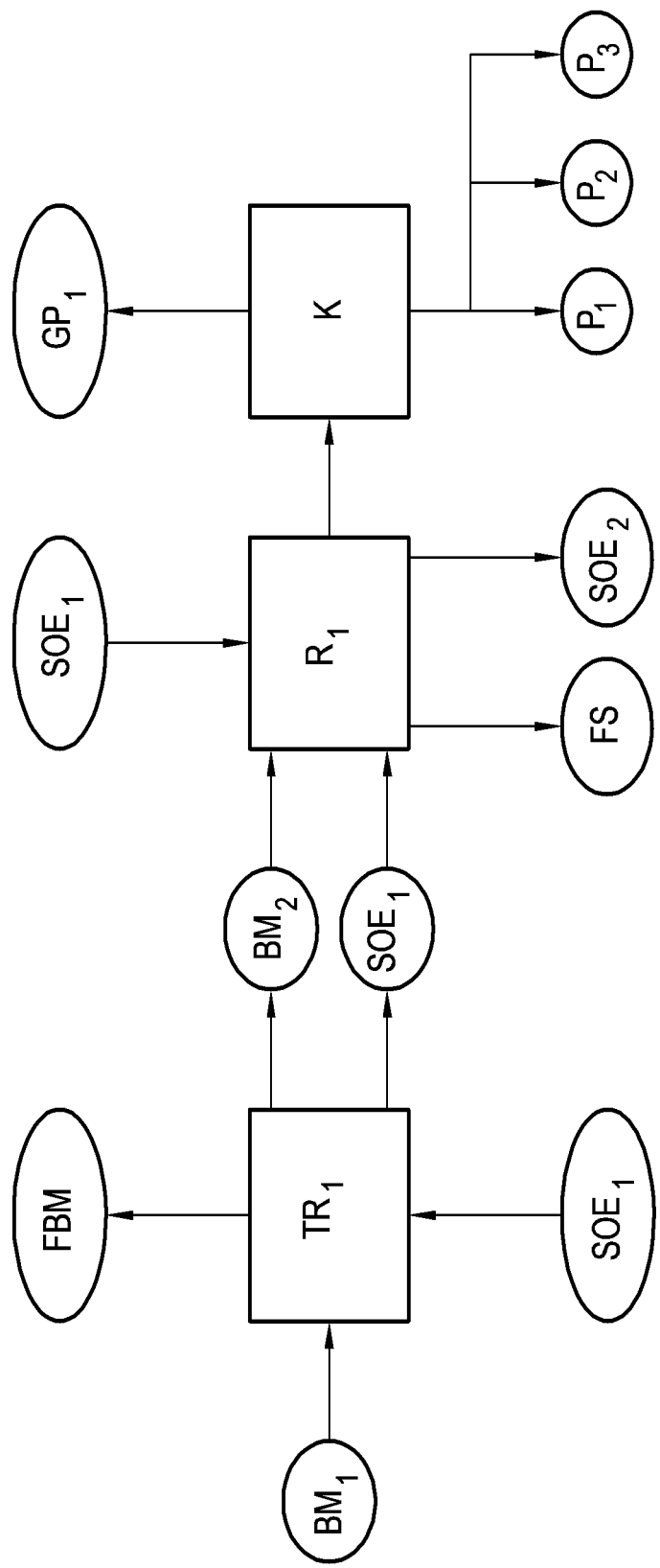
FIG. 1 shows a process diagram of a first preferred embodiment of the process according to the invention in a highly simplified illustration.

The process according to the invention can be carried out in a plant as shown in FIG. 1 in a highly simplified manner.

As can be seen in FIG. 1, the plant comprises essentially a drier $TR_1$, a reactor $R_1$ and a condenser K. In the drier $TR_1$, the biomass $BM_1$ is predried at temperatures ranging between about 110° C. and 200° C. and is contacted with the heavy oil $SOE_1$ by stirring. The biomass $BM_1$ and the heavy oil $SOE_1$ may also be supplied to the drier $TR_1$ jointly. The moisture FBM which thereby leaks from the biomass is collected, for example, in a separate condenser, which is not shown in FIG. 1.

The reactor $R_1$ consists of a heated mixing vessel in which the dried biomass $BM_2$ is dispersed in the heavy oil $SOE_1$ at temperatures ranging between 250° C. and 450° C. and, subsequently, is converted into the products. The heavy oil $SOE_1$ can also be supplied directly to the reactor $R_1$. The drier $TR_1$ and the reactor $R_1$ are equipped with an inertization plant which prevents the entry of oxygen by maintaining a minor overpressure of, for example, 35 mbar in the plant. The coal-like solid FS which develops during cracking as well as a surplus of heavy oil $SOE_2$ are withdrawn from the reactor $R_1$ and subsequently supplied to a purification unit, which is not illustrated. The remaining products reach the condenser K. Therein, the condensable components are condensed out and separated into the oily product phases $P_1$ and $P_2$ and an aqueous product phase $P_3$. Furthermore, a gas phase $GP_1$ leaves the condenser K.

A preferred first embodiment of the process according to the invention is carried out as follows:

The reactor $R_1$ and the drier $TR_1$ are filled with the heavy oil $SOE_1$, for example, a vacuum gas oil (VGO), and heated. The reactor $R_1$ is heated to a temperature of from 320° C. to 400° C. and the drier is heated to 150° C. Predried wood chips having an initial moisture of about 10% by weight of moisture content are used as the biomass BK. Said biomass is introduced continuously from a storage vessel into the drier $TR_1$ filled with VGO. In the drier $TR_1$, the biomass is distributed in the VGO using a stirrer and, in doing so, the water physically bound in the biomass is expelled. This preliminary drying in the drier $TR_1$ to a moisture content of, at most, 1% by weight, based on the biomass, is necessary for reducing the amount of water introduced into the reactor $R_1$. Thus, the amount of uncleaved heavy oil in the reactor $R_1$ decreases, which would otherwise be dragged undesirably into the product oil phase by the rising water vapour. By drying the biomass in the drier $TR_1$, the amounts of recycling streams, which have been accumulating, are advantageously also reduced for a subsequent regeneration.

After the biomass $BM_2$ has been dried, it is conveyed into the reactor $R_1$ in which the actual cleavage of the heavy oil (VGO) and—parallel thereto—the liquid-phase pyrolysis occur. For example, temperatures ranging between 320 and 400° C. at normal pressure prevail in the reactor.

Two processes occur in the reactor $R_1$ due to the supply of biomass. A part of the heavy oil VGO, which is used, is thereby cleaved into directly condensable products (alkenes) by the catalytic effect of the biomass, which represents the actual product oil phase of said process. The dried biomass $BM_2$, which has been introduced, is subjected to liquid-phase pyrolysis and is thereby converted into a pyrolysis gas, pyrolysis coal and a pyrolysis oil. The product gases forming in the reactor are supplied to a condenser K, and the amount of directly liquefiable components is condensed out. The accumulating condensation mixture is separated from the accumulating pyrolysis oil (aqueous) in a liquid-liquid separation and is then subjected to rectification in order to separate the uncleaved heavy oil. Subsequently, the recovered heavy oil is returned into the reactor.

As the operating period progresses, the solids FS accumulating due to the pyrolysis gather in the heavy oil $SOE_2$ as a coal and must be separated from the heavy oil $SOE_2$ by a solid-liquid separation. Following the separation, those solids FS can be freed from the heavy oil bound therein either by extraction or can be thermally utilized directly with the sticking heavy oil (with a heavy-oil content of about 50%).

Figure 2:
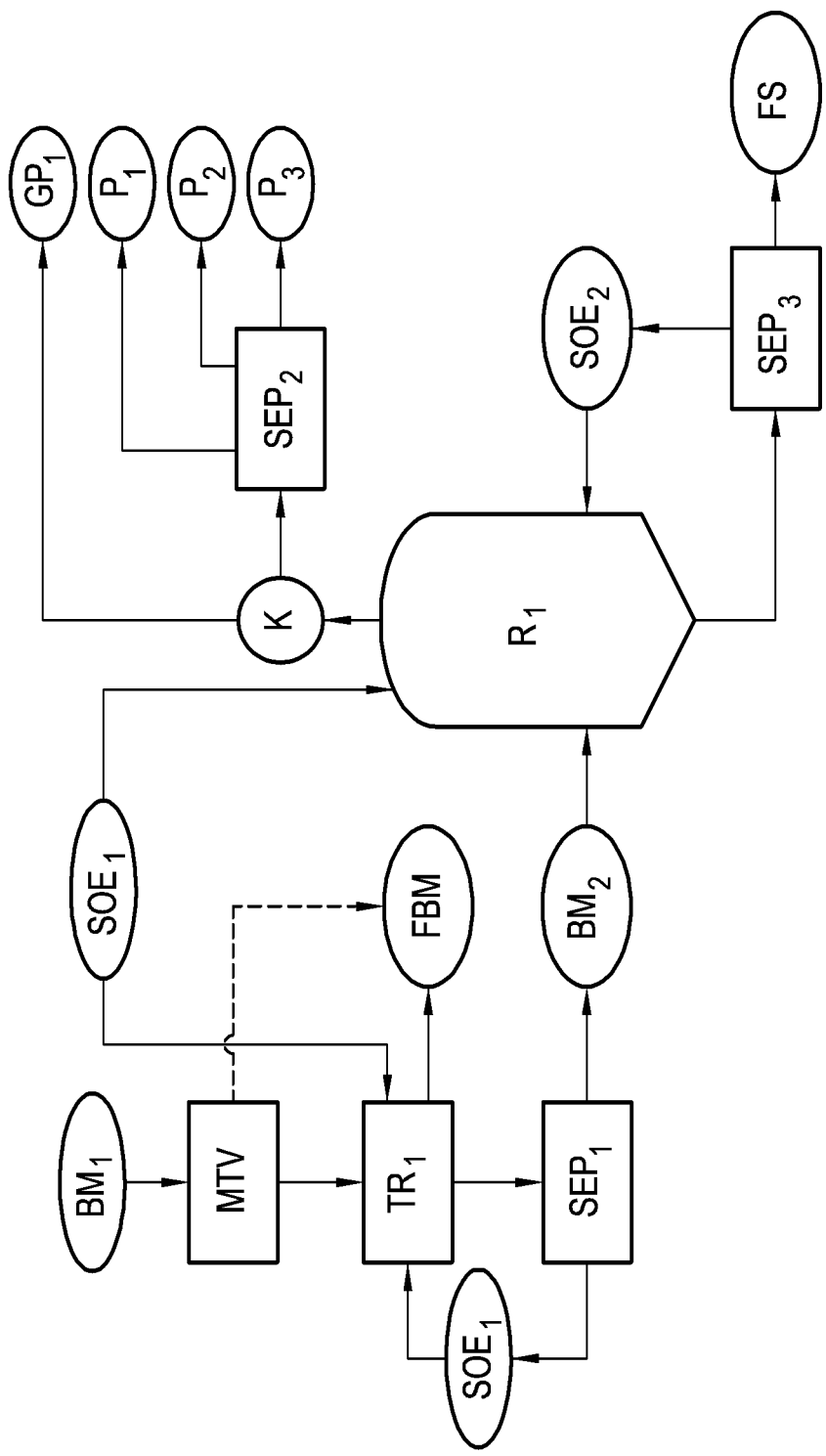
FIG. 2 shows a process diagram of a second preferred embodiment of the process according to the invention in a highly simplified illustration.

FIG. 2 shows, in a highly simplified manner, a second preferred embodiment of a process according to the invention for continuously obtaining a combustible or fuel, respectively. The biomass $BM_1$ is thereby crushed to a particle volume of less than 125 mm$^3$ in a mechanical-thermal pretreatment unit MTV, for example, in one or several mills. Furthermore, the initial moisture of the biomass can be reduced by a moisture content FBM already during the mechanical crushing in the pretreatment unit MTV, or it can be treated in a subsequent thermal drier. For this purpose, the moisture content FBM is removed from the biomass, for example, into a condensate separator.

Subsequently, the crushed biomass is contacted with the preheated heavy oil $SOE_1$ and dried at temperatures of between 110° C. and 200° C. in a drying $TR_1$. For an intense contact between biomass and heavy oil, the drying $TR_1$ comprises a mixing device and optionally also a conveyor. In the drying $TR_1$, the biomass is preheated by the intense contact and dried to a moisture content of, at most, 1.0% by weight, based on the biomass. The condensed moisture content of the biomass FBM is withdrawn from the drier $TR_1$ and likewise collected in a condensate separator.

The biomass $BM_2$ pretreated in this way is supplied to a following treatment step $SEP_1$ in which a mechanical deoiling of the biomass takes place and the excess heavy oil $SOE_1$ is separated again and returned into the drier $TR_1$. In doing so, the amount of biomass $BM_2$ in the heavy oil $SOE_1$ is preferably adjusted to more than 25% by weight, based on the total mass. Thus, it is achieved that an as small as possible amount of heavy oil $SOE_1$ having a temperature of, at most, 200° C. reaches the following reactor unit $R_1$ and cools said unit too strongly. Depending on the requirement and the composition of the biomass used, respectively, for example sieves, screw extruders or decanters can be used in treatment step $SEP_1$ for separating the excess heavy oil from the biomass. The temperature of the educts is maintained between 110° C. and 200° C. during the treatment step $SEP_1$.

The dried biomass $BM_2$ is introduced into the reactor unit $R_1$ in which the following reaction conditions prevail: temperatures between 250° C. and 450° C. at pressures between 0.1 bar and 80 bar, preferably at an overpressure which is smaller than 100 mbar compared to atmospheric pressure. For safety reasons, the reactor unit is provided with an inertization plant and is overlaid by an inert protective gas. The reactor unit $R_1$ comprises a reactor with appropriate outlets for the discharge of water vapour and for the withdrawal of the liquid product phases, as well as at least one stirring and/or dispersing device. Furthermore, heating devices are provided.

The vaporous top product gets from the reactor $R_1$ into a condenser K. For the condensation of the vapour phase, the condenser K can also have a multistage design and is configured for condensation temperatures ranging between 450° C. and about 30° C. The condenser K can be designed, for example, as a fixed head tubular heat exchanger or as a spray-type cooler and serves for the separation of the liquid product phases from non-condensable gases which are discharged from the process as the gas phase $GP_1$.

In the separation unit $SEP_2$, the liquid product phases are divided into different fractions according to their densities, for example, by means of centrifugal and/or gravitational separators. Furthermore, the fractions can be divided into hydrophilic and hydrophobic phases. Several product phases $P_1$, $P_2$, $P_3$ are obtained, wherein, for example, $P_3$ is a phase abounding in water. The product phases $P_1$, $P_2$ abounding in oil are available, depending on their compositions, at least as initial products for further utilization as combustibles and fuels, respectively.

In the separation unit $SEP_3$, the bottom products of the crack reaction are separated from the reactor $R_1$. Solids FS, for example coal, mineral ashes as well as incompletely converted biomass, are separated from the excess high-boiling amount of the heavy oil $SOE_2$ at operating temperatures ranging between 80° C. and 450° C. and are discharged from the process. The heavy oil $SOE_2$, which has been separated, is returned into the reactor $R_1$ and can be cracked again in the presence of a biomass.

EXAMPLE 1

The conditions applied in Example 1, which is illustrated here, are listed below.

A series of experiments was carried out in order to examine the influence of the biomass moisture on the economical and efficient cleavage of high-boiling oil. A high-boiling refined mineral oil having an initial boiling point of over 400° C. (at a pressure of 1 bar) and a modal value of the molecule length at $C_{36}H_{74}$ was, in each case, used as a heavy oil. By drying the biomass to a moisture content of, at most, 1.0% by weight, a clear increase in the efficiency of the desired cleavage of the heavy oil toward lower boiling fractions could be obtained.

Test Conditions:
Reactor temperature: 350° C.
Reactor pressure: 10 mbar overpressure above atmospheric pressure
Heavy oil: Phi-Oil Katstart Gold 25
Biomass: bark-free spruce wood chips pretreated to a different residual moisture prior to the entry into the reactor In every experiment, the test facility was, in each case, filled with about 1600 g heavy oil, heated to a temperature of 350° C. and kept at this temperature for 20 min. Without the addition of biomass, no formation of cleavage products by thermal cracking of the heavy oil could thereby be determined Per experiment, a total of 270 g biomass was gradually added to the heavy oil, which was maintained at 350° C., in portions of about 10 g over a period of 2.5 hours. In doing so, the biomass was predried such that it had a different moisture content in every experiment.

Figure 3:
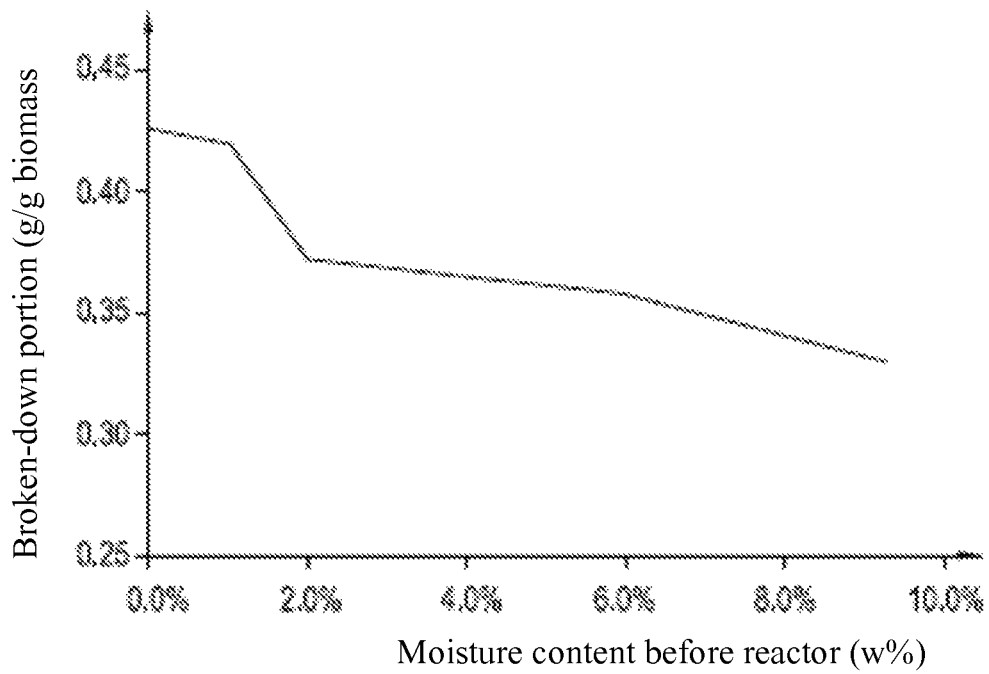
FIG. 3 shows in chart form the impact of the moisture content of the biomass on the cleaved amount of refined heavy oil according to Example 1.

FIG. 3 summarizes the test results and shows in chart form the impact of the moisture content of the biomass on the cleavage of a high-boiling refined heavy oil. The amount of cleaved heavy oil was thereby determined by separation in a gas-phase chromatograph and evaluation via a mass spectrometer. A moisture content which had been reduced to, at most, 1% by weight, based on the biomass, by drying the biomass produced a yield of cleavage products which was increased by up to about 30% in comparison to experiments in which the moisture content of the biomass had been adjusted to 2% by weight or more.

EXAMPLE 2

A series of experiments comprising pretreatments of the biomass of different lengths was carried out in order to examine the influence of the pretreatment of the biomass with a hot heavy oil. A vacuum gas oil having an initial boiling point of about 375° C. (at a pressure of 1 bar) was used as a heavy oil. By conditioning the biomass to a moisture content of, at most, 1% by weight, based on the biomass, a clear increase in the efficiency of the desired cleavage of the heavy oil toward lower boiling fractions could be obtained.

Test Conditions:
Reactor temperature: 350° C.
Reactor pressure: 10 mbar overpressure above atmospheric pressure
Heavy oil: vacuum gas oil (VGO)
Biomass: bark-free spruce wood chips pretreated to a different residual moisture prior to the entry into the reactor In every experiment, the test facility was filled with about 1300 g oil, heated to a required temperature of 350° C. and kept at this temperature for 20 min. Without the addition of biomass, no product formation by thermal cracking of the heavy oil could be determined during this period. Subsequently, a total of 270 g biomass was gradually added per experiment in portions of about 10 g over a period of 2.5 hours. During this test duration, the heavy oil was maintained at a temperature of 350° C. The added biomass had previously been pretreated in heavy oil VGO at a temperature of about 150° C. in such a way that it had a different moisture content per experiment. Before being added into the reactor, the biomass was brought mechanically by filtration to a solids content of more than 75% by weight, based on the total mass, and consequently was present as a filtration residue.

Figure 4:
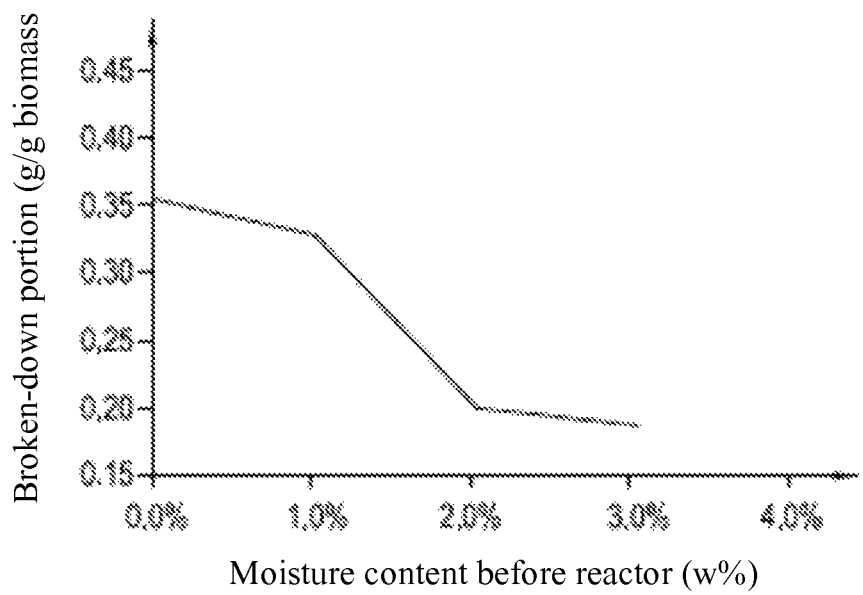
FIG. 4 shows in chart form the impact of the moisture content of the biomass on the cleaved amount of vacuum gas oil according to Example 2.

FIG. 4 summarizes the results and shows in chart form the impact of the moisture content of the biomass pretreated in the heavy oil VGO on the cleavage of the high-boiling refined heavy oil VGO. Thereby, the amount of cleaved heavy oil was again determined by separation in a gas-phase chromatograph and evaluation via a mass spectrometer. A moisture content which had been reduced to, at most, 1% by weight, based on the biomass, by drying the biomass in a heated heavy oil likewise produced a yield of cleavage products which was increased in comparison to experiments in which the moisture content of the biomass had been adjusted to 2% by weight or more.

The experiments both in Example 1 and in Example 2 were, in each case, carried out without the addition of a catalyst. Analyses in which mineral or silicious catalysts known from the relevant literature were added likewise showed the same trend, namely that, with a moisture content of, at most, 1% by weight, based on the biomass, the conversion of desired cleavage products was clearly higher than with higher moistures of the added biomass. In general, the conversion of cleavage products, which was achieved, was barely increased by adding the analyzed catalysts and was essentially the same as in comparative experiments without the addition of a catalyst.

Therefore, the use of mineral or silicious catalysts can advantageously be omitted in the process according to the invention for obtaining a combustible or fuel, respectively.

The invention claimed is:

1. A process for obtaining a combustible, the process comprising:
thermally cracking a heavy oil in the presence of a wet, hydrocarbonaceous biomass with a moisture content of 1.0% by weight at most by heating the heavy oil until the pyrolysis of the hydrocarbonaceous biomass, whereby the combustibles are formed, removed from the heated heavy oil and subsequently condensed, wherein a hydrocarbonaceous biomass is used, which is subjected to a drying step to ensure a moisture content of 1.0% by weight at most, based on the biomass, wherein the biomass facilitates the thermal cracking without a catalyst, wherein the pyrolysis is liquid phase pyrolysis.

2. A process according to claim 1, wherein the hydrocarbonaceous biomass is used having the moisture content which amounts to, at most, 0.5% by weight, based on the biomass.

3. A process according to claim 1, wherein the biomass is contained in the heavy oil in a maximum amount of 30% by weight, based on the total mass.

4. A process according to claim 3, wherein the biomass is contained in the heavy oil in a maximum amount of 20% by weight, based on the total mass.

5. A process according to claim 3, wherein the biomass is contained in the heavy oil in an amount of less than 5% by weight, based on the total mass.

6. A process according to claim 1, wherein the heavy oil is heated to a temperature of between 250° C. and 450° C.

7. A process according to claim 6, wherein the heavy oil is heated to a temperature of between 320° C. and 400° C.

8. A process according to claim 1, wherein a residual oil from crude oil distillation is used as the heavy oil.

9. A process according to claim 1, wherein in the heavy oil cracking process the hydrocarbonaceous biomass is used having a moisture content which has been adjusted by drying in a heated heavy oil.

10. A process according to claim 9, wherein the biomass is separated from the excess heavy oil by a separation process after drying, with the biomass being contained in the heavy oil in an amount of more than 15% by weight based on the total mass after the drying.

11. A process according to claim 1, wherein the combustible is a fuel.

12. A process according to claim 9, wherein the biomass is separated from the excess heavy oil by a separation process after drying, with the biomass being contained in the heavy oil in an amount of more than 25% by weight based on the total mass.

13. A process for obtaining a combustible, the process comprising:
thermally cracking a heavy oil in the presence of a wet, hydrocarbonaceous biomass with a moisture content of 1.0% by weight at most by heating the heavy oil until the pyrolysis of the hydrocarbonaceous biomass, whereby the combustibles are formed, removed from the heated heavy oil and subsequently condensed, wherein the biomass facilitates the thermal cracking without a catalyst, wherein;

the moisture content of a hydrocarbonaceous biomass is adjusted to a moisture content of 1.0% by weight at most, based on the biomass used, the biomass is separated from the excess heavy oil by a separation process after drying, and the biomass is contained in the heavy oil in a maximum amount of 30% by weight, based on the total mass, wherein the pyrolysis is liquid phase pyrolysis.

14. A process for obtaining a combustible, the process comprising:

thermally cracking a heavy oil in the presence of a wet, hydrocarbonaceous biomass with a moisture content of 1.0% by weight at most that facilitates the thermal cracking without a catalyst, by heating the heavy oil until the pyrolysis of the hydrocarbonaceous biomass, whereby the combustibles are formed, removed from the heated heavy oil and subsequently condensed, wherein the hydrocarbonaceous biomass is used, which is subjected to a drying step to ensure a moisture content of 1.0% by weight at most, based on the biomass, the thermal cracking being performed without a mineral or siliceous catalyst, wherein the pyrolysis is liquid phase pyrolysis.

15. A process according to claim 14, wherein in the heavy oil cracking process the hydrocarbonaceous biomass is used having a moisture content which has been adjusted by drying in a heated heavy oil.

16. A process according to claim 15, wherein the biomass is separated from the excess heavy oil by a separation process after drying, with the biomass being contained in the heavy oil in an amount of more than 15% by weight based on the total mass after the drying.

17. A process according to claim 14, wherein the biomass is contained in the heavy oil in an amount of less than 5% by weight, based on the total mass.

18. A process according to claim 14, wherein the heavy oil is heated to a temperature of between 250° C. and 450° C.

* * * * *